United States Patent
Zhang

(10) Patent No.: US 7,096,754 B2
(45) Date of Patent: Aug. 29, 2006

(54) NESTED SECTOR GEARS

(75) Inventor: Tian Zhang, Scarborough (CA)

(73) Assignee: Intier Automotive Closures, Inc., Newmarket (CA)

( * ) Notice: Subject to any disclaimer, the term of this patent is extended or adjusted under 35 U.S.C. 154(b) by 268 days.

(21) Appl. No.: 10/471,219

(22) PCT Filed: Mar. 6, 2002

(86) PCT No.: PCT/CA02/00325

§ 371 (c)(1),
(2), (4) Date: Sep. 8, 2003

(87) PCT Pub. No.: WO02/070848

PCT Pub. Date: Sep. 12, 2002

(65) Prior Publication Data

US 2004/0112159 A1    Jun. 17, 2004

(51) Int. Cl.
*F16H 55/17* (2006.01)

(52) U.S. Cl. ............... 74/435; 74/439; 74/431; 29/412

(58) Field of Classification Search ............ 74/431, 74/439, 435, 89.18; 29/412, 415–417, 893.33
See application file for complete search history.

(56) References Cited

U.S. PATENT DOCUMENTS

| | | | |
|---|---|---|---|
| 619,537 A | 2/1899 | Bufford | |
| 652,990 A * | 7/1900 | Wood | 336/217 |
| 1,670,475 A | 5/1928 | Nicholson | |
| 1,842,520 A * | 1/1932 | Floraday | 29/893.33 |
| 2,811,047 A * | 10/1957 | Christoph | 74/96 |
| 2,829,885 A * | 4/1958 | Russell | 74/89.14 |
| 2,949,039 A * | 8/1960 | Dudchik | 74/384 |
| 3,037,271 A | 6/1962 | Schilberg | |
| 3,478,614 A | 11/1969 | Shimano | |
| 3,772,932 A | 11/1973 | Nagano | |
| 3,956,943 A | 5/1976 | Yamasaki | |
| 4,018,095 A | 4/1977 | Shimano | |
| 4,173,845 A | 11/1979 | Heesch | |
| 4,268,259 A | 5/1981 | Segawa et al. | |

FOREIGN PATENT DOCUMENTS

| | | |
|---|---|---|
| DE | 27 01 150 A1 | 1/1977 |
| DE | 2701150 A1 * | 7/1978 |
| EP | WO 99/14012 | 3/1999 |

* cited by examiner

Primary Examiner—Richard Ridley
Assistant Examiner—Justin Krause
(74) Attorney, Agent, or Firm—Clark Hill PLC

(57) ABSTRACT

A sector gear is formed as one of a pair of mirror image gears (12, 14). Each of the sector gears has an arcuate portion (16) having a series of teeth (18) on an outer periphery thereof, and a V-shaped base portion (20) having a first leg (22), a second leg (24) and an apex portion (26). The first leg (22) has an S-shaped configuration and connects with the arcuate portion (16) at a first end thereof. The second leg (24) has an inverted S-shape and connects with the arcuate portion (16) near an arcuate mid-length of the arcuate portion (16). The first leg (22) and second leg (24) merge smoothly with the apex portion (26). The apex portion (26) has an aperture (30) at a radial center of the arcuate portion (16). Each of the gears has an inner periphery (28) that enables complementary nesting of the pair of sector gears (12, 14).

5 Claims, 2 Drawing Sheets

US 7,096,754 B2

NESTED SECTOR GEARS

FIELD OF INVENTION

This invention relates to a method for producing sector gears and the sector gears made therefrom.

BACKGROUND OF INVENTION

Window regulators on vehicles commonly employ sector gears in order to reduce the effort required to open and close a window. The prior art sectors gears are "pie slice" shaped. The outer curved edged has a series of teeth, while the narrow end has an aperture defining the center of rotation of the gear. The intermediate portion between the outer periphery and the center of rotation is often removed in order to reduce weight of the sector gear.

The prior art sector gears are stamped from sheet metal. If the sector gear has an angle of about 45°, a plurality of sector gears can be stamped in an alternating fashion in order to reduce scrap. However, the intermediate portion must still be stamped out and discarded or recycling.

If the sector gear has an angle of greater than 45° (FIG. 3), the sector gears cannot be arranged in an efficient manner. The size of sheet metal required to stamp a single gear is approximately the length of the longest dimension by the narrow dimension. The corners and the intermediate portions are discarded or recycled.

SUMMARY OF INVENTION

The disadvantages of the prior art may be overcome by providing a sector gear having a configuration which enables high density nesting to minimize scrap, yet maintain strength and performance characteristics.

According to one aspect of the invention, there is provided a sector gear formed as one of a pair of mirror image sector gears. Each of the sector gears has an arcuate portion having a series of teeth on an outer periphery thereof, and a V-shaped base portion having a first leg, a second leg and an apex portion. The first leg has an S-shaped configuration and connects with the arctuate portion at a first end thereof. The second leg has an inverted S-shape and connects with the arcuate portion near an arcuate mid-length of the arcuate portion. The first leg and second leg merge smoothly with the apex portion. The apex portion has an aperture at a radial center of the arcuate portion. Each of the gears has an inner periphery that enables complementary nesting of the pair of sector gears According to another aspect of the invention, the degree of nesting of the nested pair of sector gears can be controlled by the degree of curvature of the second leg of the base portion.

DESCRIPTION OF THE DRAWINGS

Drawings which illustrate the present invention, in which.

DESCRIPTION OF THE PRESENT INVENTION

Figure 1:
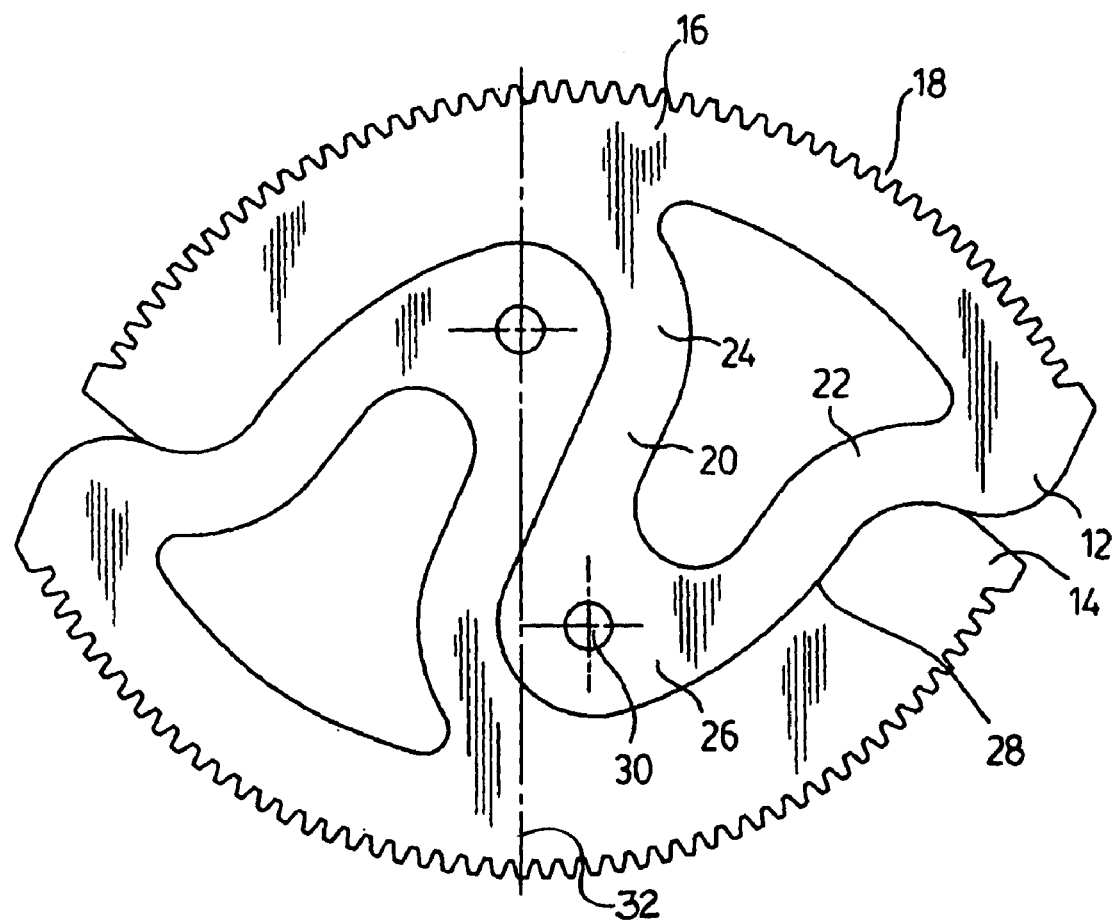
FIG. 1 is a plan view of a pair of nested sector gears of a first embodiment the present invention.

Referring to FIG. 1, there is illustrated a pair of nested sector gears 12, 14 of the present invention. The sector gears 12, 14 are mirror images of each other and formed in an inverted back to back relation.

Sector gear 12 has an arcuate portion 16. The outer periphery of the arcuate portion 16 has a series of teeth 18.

A V-shaped base portion 20 is integrally connected to the arcuate portion 16. Base portion 20 has a first leg 22, a second leg 24 and an apex 26. First leg 22 preferably has an S-shaped configuration extending from an end region of the arcuate portion 16. The first leg 22 merges smoothly with the apex 26. The second leg has an S-shaped configuration, inverted relative to the S-shaped configuration of first leg 22. The second leg 24 extends from approximately the circumferential mid-length of the arcuate portion 16 and merges smoothly with the apex 26.

The inner periphery 28 of the base portion 20 is configured to nest with a like periphery in an inverted back to back relation as illustrated.

The apex 26 has an aperture 30 which is located at the radial center of the arcuate portion 16. There is an imaginary line 32 extending from the radial center of aperture 30 to the circumferential mid-length of the arcuate portion 16. Second leg 24 will extend arcuately away from this line 32. In the preferred embodiment, the line 32 of one of the sector gears 12, 14 will extend generally parallel to each other.

Figure 2:
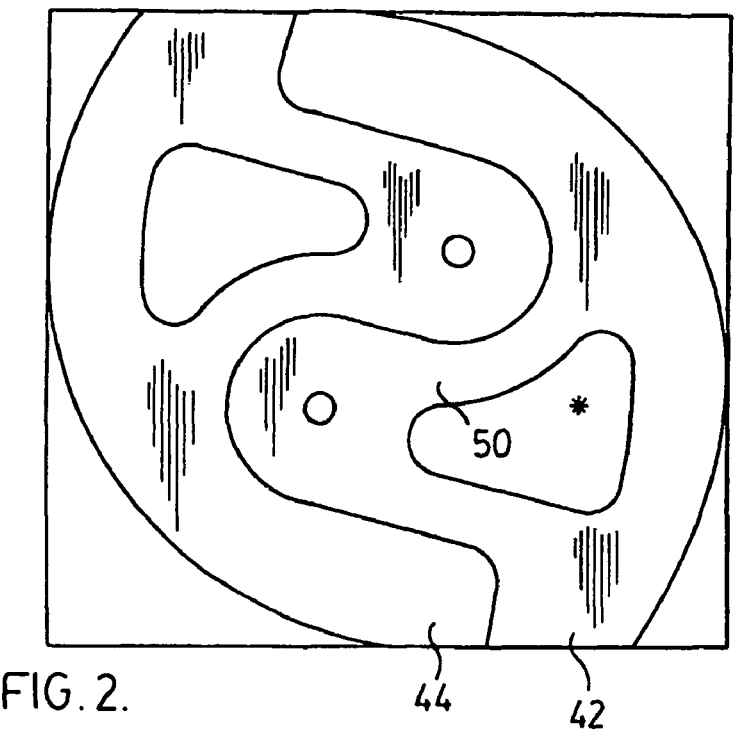
FIG. 2 is a plan view of a pair of nested sector gears of a second embodiment of the present invention.

Referring to FIG. 2, a second embodiment of the present invention is illustrated. The nested pair of sector gears 42, 44 are identical to the nested pair of sector gears 12, 14, except that the second leg 50 has a more pronounced curvature than second leg 24. By increasing the curvature, a higher degree of nesting and therefore material efficiency can be achieved.

Figure 3:
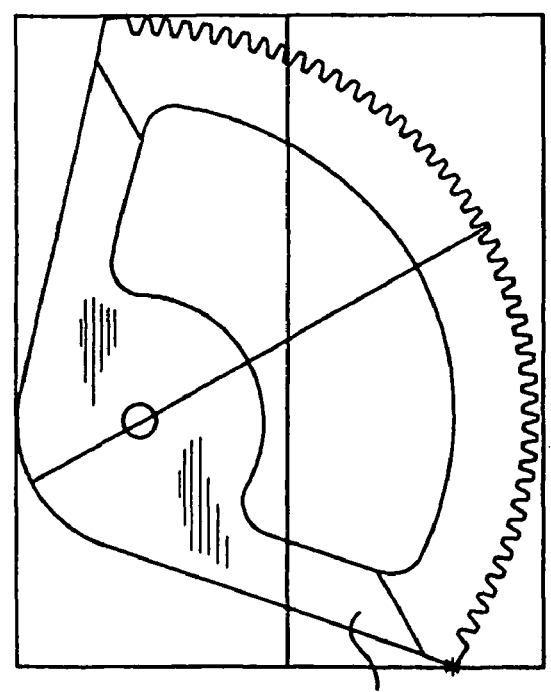
FIG. 3 is a plan view of a sector gear of the prior art.

In comparison with a conventional sector gear 60, as illustrated in FIG. 3, a pair of nested sector gears can be stamped from an area of sheet of material slightly larger than the area occupied by the prior art sector gear 60. The nested pair of sector gears provides about 36% savings in material and approximately a reduction of about 3% in weight. Surprisingly, the sector gears 12, 14 of the present invention are capable of carrying loads comparable with the conventional sector gear 60.

In the preferred embodiment, the nested pair of sector gears are stamped from sheet material, preferably 3.22 mm sheet steel. However, other materials known in the art may also be used.

The above-described embodiment of the invention is intended to be an example of the present invention and alterations and modifications may be effected thereto, by those of skill in the art, without departing from the scope of the invention as defined in the attached claims.

What is claimed:

1. A sector gear formed as one of a pair of mirror image gears from a single sheet material, each of said mirror image gears comprising an arcuate portion having a series of teeth on an outer periphery thereof, said arcuate portion extending longitudinally between opposing first and second ends, a V-shaped base portion having an apex portion, said apex portion having an aperture at a radial center of said arcuate portion, said mirror image gears being contoured to nest with each other as said pair of mirror image gears are formed, and said base portion including a first leg having an S-shaped configuration extending from one of said first and second ends of said arcuate portion to said apex portion and a second leg having an inverted S-shaped configuration relative to said first leg and extending from said radial center of said arcuate portion to said apex portion.

2. A sector gear as claimed in claim 1, wherein each of said mirror image gears has an inner periphery defined by said base portion and an inner edge of said arcuate portion, said inner periphery of one of said pair of mirror image gears complementarily nests within said inner periphery of the other of said pair of mirror image gears.

3. A sector gear as claimed in claim 2 wherein said first and second legs connect with each other defining said apex portion aligned with said radial center of said arcuate portion.

4. A sector gear as claimed in claim 3 wherein said gears are stamped from a single sheet material in a nested condition.

5. A sector gear as claimed in claim 4 wherein said sheet material is steel.

\* \* \* \* \*